Figure 1:
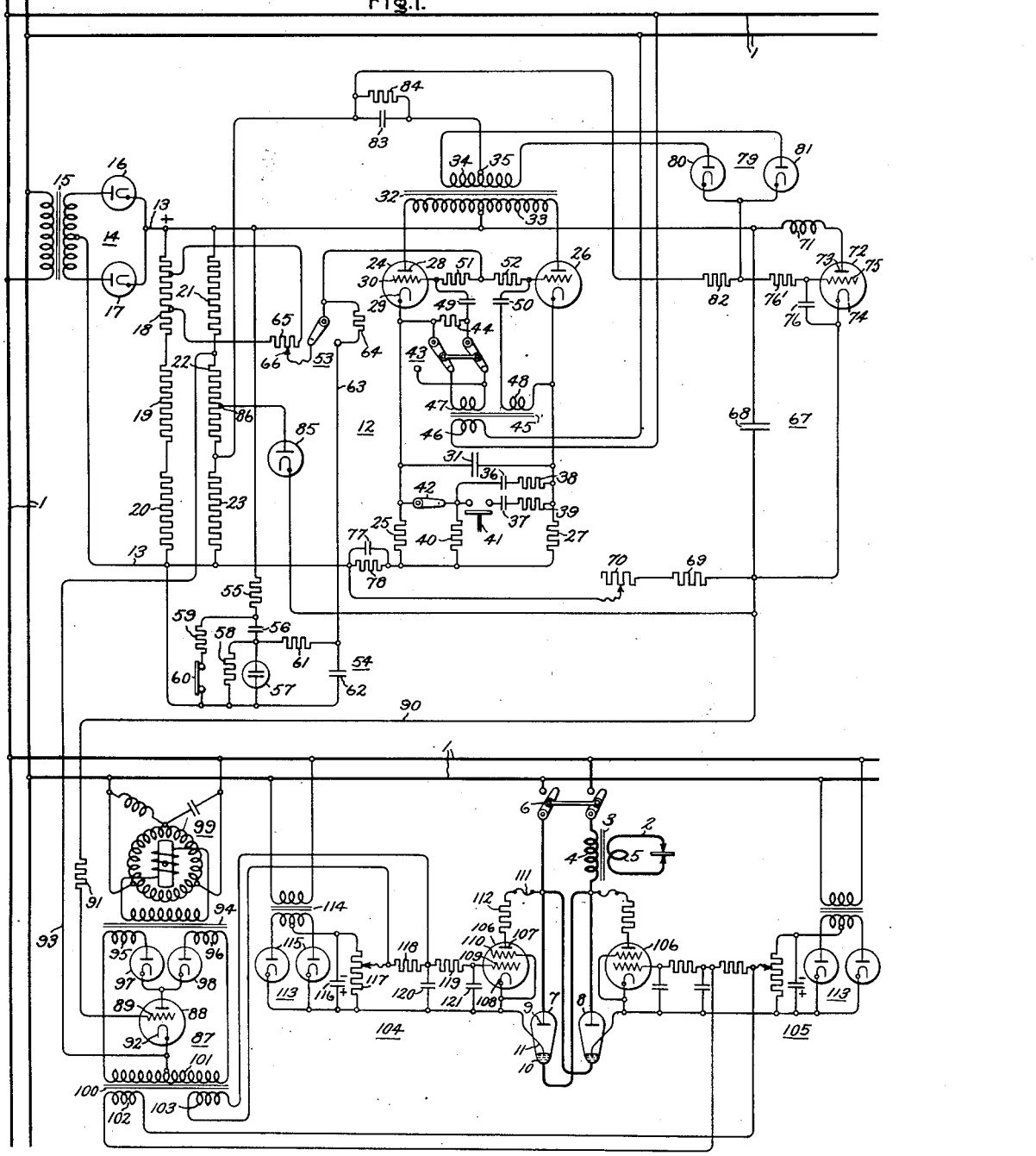

Patented July 18, 1939

2,166,305

UNITED STATES PATENT OFFICE 2,166,305

THYRATRON WELDING CONTROL

Louis G. Levoy, Jr., Ballston Lake, and George W. Garman, Scotia, N. Y., assignors to General Electric Company, a corporation of New York Application June 2, 1937, Serial No. 146,020

8 Claims. (Cl. 250—27)

Our invention relates to electric translating apparatus and more particularly to control circuits for electric valve translating apparatus.

Heretofore there have been devised numerous circuits for controlling the operation of electric valve translating apparatus to effect periodic or intermittent energization of a load circuit from an alternating current supply circuit. Many of these arrangements have employed electric valve circuits for generating periodic electrical quantities, such as voltages or currents, to control the periodicity of the energization of the load circuit and these arrangements have also been employed to control the amount of energy transmitted to the load circuit during each period of energization and for controlling the ratio of the intervals of conduction to the intervals of nonconduction. However, in these prior art arrangements there has been evidenced considerable difficulty in effecting the desired flexibility of control of the periodicity of the energizations without sacrificing the highly desirable precision of control of the ratio of the intervals of conduction to the intervals of nonconduction. For example, in electric welding circuits where it is desirable to provide periodic energizations of the welding circuit, it is also desirable to provide control circuits in which the amount of energy transmitted to the load circuit and the ratio of the intervals of conduction to the intervals of nonconduction are accurately and precisely determinable and controllable.

It is an object of our invention to provide a new and improved electric valve translating circuit.

It is another object of our invention to provide a new and improved control system for electric valve translating apparatus.

It is a further object of our invention to provide a new and improved electric valve circuit for controlling an electric valve translating apparatus to effect periodic or intermittent energization of an associated load circuit in which the ratio of the intervals of conduction to the intervals of nonconduction is precisely and accurately controllable.

In accordance with the illustrated embodiment of our invention, we provide an electric valve translating circuit for transmitting energy from an alternating current supply circuit to a load circuit, such as a welding circuit. A control system is employed to control the conductivities of main or power electric valves of the translating apparatus whereby periodic or intermittent energization of the load circuit may be effected, or whereby the load circuit may be energized during an accurately determinable interval of time in accordance with a single circuit controlling operation. More particularly, the control system includes an electric valve circuit for generating an electrical impulse, or a train of electrical impulses, to determine the periodicity of the energization of the load circuit. The generation of the electrical impulses may be controlled so that consecutive impulses occur during half cycles of voltage of opposite polarity of the alternating current supply circuit or during half cycles of voltage of a predetermined polarity of the supply circuit. The electric valve control system also includes an independent second circuit for generating a voltage which controls the period of energization of the load circuit and the amount of energy transmitted thereto, or when the system is operating to effect intermittent or periodic energization of the load circuit, the second circuit controls the amount of energy transmitted to the load circuit and controls the ratio of the intervals of conduction to the intervals of nonconduction of the main or power electric valves.

Figure 2:
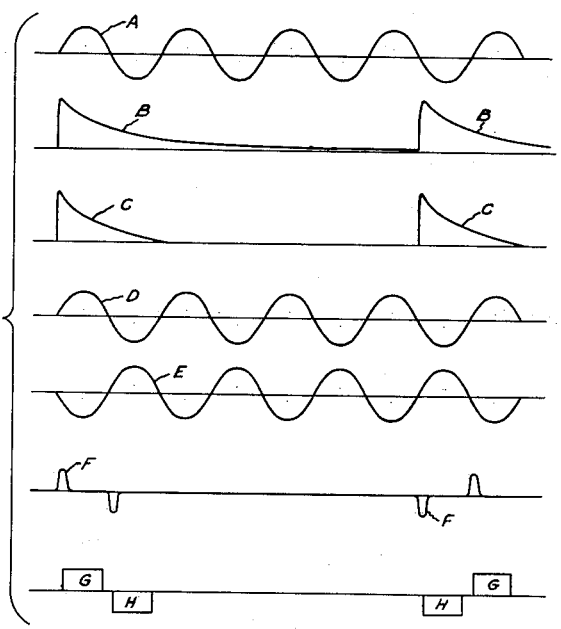

For a better understanding of our invention, reference may be had to the following description taken in connection with the accompanying drawings and its scope will be pointed out in the appended claims. Fig. 1 of the accompanying drawings diagrammatically shows an embodiment of our invention as applied to an electric valve translating system for energizing a welding circuit; and Fig. 2 represents certain operating characteristics thereof.

In Fig. 1 of the accompanying drawings our invention is shown diagrammatically as applied to an electric valve translating system for transmitting energy from an alternating current supply circuit 1 to a load circuit, such as a welding circuit 2, through a transformer 3 having a primary winding 4 and a secondary winding 5. A suitable circuit controlling means, such as a switch 6, may be interposed between the supply circuit 1 and transformer 3. A pair of oppositely connected electric valves 7 and 8 are connected in series relation with the primary winding 4 of transformer 3 and serve to control the voltage impressed on the winding 4 and to thereby control the current transmitted to the welding circuit 2. The electric valves 7 and 8 are preferably of the type employing an ionizable medium, such as a gas or a vapor, and in the particular arrangement illustrated in the drawings these valves are shown as being of the type employing an anode 9, a mercury pool cathode 10 and a control member 11 of the immersion-igniter type.

To control the energization of the control members 11 of electric valves 7 and 8 to control the periodicity of the energization of load circuit 2 from supply circuit 1, we employ a circuit 12 which generates periodic electrical impulses or generates a predetermined number of periodic electrical impulses in response to a single circuit controlling operation. The circuit 12 may be of the type disclosed and claimed in a copending application of Harold W. Lord, Serial No. 146,019 filed concurrently herewith and assigned to the assignee of the present application. The circuit 12 includes a source of direct current 13. The source of direct current 13 may be supplied by any suitable arrangement such as a bi-phase rectifier 14 including a transformer 15, which is connected to the alternating current circuit 1, and a pair of unidirectional conducting devices 16 and 17. The circuit 12 also includes a voltage divider including serially-connected resistances 18, 19 and 20 which are connected across the source of direct current 13, and includes a second voltage divider including resistances 21, 22 and 23 which are connected in series relation across the direct current source 13. A pair of parallel electric paths are connected to be energized from the direct current source 13; one of these paths includes electric valve 24 and a serially-connected impedance element 25 and the other parallel path includes electric valve 26 and a serially-connected impedance element 27. The electric valves 24 and 26 are preferably of the type employing an ionizable medium, such as a gas or a vapor, and each includes an anode 28, a cathode 29 and a control member 30. A capacitance 31 is connected across the parallel paths and is arranged to be charged alternately in opposite directions through electric valves 24 and 26 from the direct current source 13. An inductive device, such as a transformer 32 having a primary winding 33 connected in the anode-cathode circuits of electric valves 24 and 26 is employed to supply alternating voltages in response to the electrical impulses generated in the circuit 12 due to the charging of the capacitance 31. The transformer 32 is also provided with a secondary winding 34 having a neutral connection 35.

Suitable impedance means including capacitances 36 and 37, resistances 38, 39 and 40 and circuit controlling means, such as a switch 41, may be connected in the circuit 12 to control the period of the electrical impulses generated by circuit 12. A switch 42 may be connected in the circuit to provide additional flexibility in the control of the periodicity of the electrical impulses generated by this circuit.

As a means for controlling the circuit 12 to generate electrical impulses of which consecutive impulses occur during half cycles of voltage of opposite polarity of the supply circuit 1 or during half cycles of voltage of a predetermined polarity of the circuit 1, we employ an excitation circuit including a suitable circuit controlling means, such as a reversing switch 43, which impresses on control members 30 of electric valves 24 and 26 alternating voltages displaced 180 electrical degrees or in-phase alternating voltages. The switch 43 is preferably of the snap acting type biased to the left-hand position and to the right-hand position. An impedance 44 of relatively large value is connected across the switch 43 to prevent the grids 30 of electric valves 24 and 26 from floating during switching operations. The excitation circuit also includes a transformer 45 having a primary winding 46 and secondary windings 47 and 48 which supply the alternating voltages for energizing control members 30 of electric valves 24 and 26. Primary winding 46 is connected to alternating current circuit 1. The voltage supplied by the secondary winding 47 is impressed across cathode 29 and control member 30 of electric valve 24 through a circuit including a capacitance 49, and the voltage supplied by secondary winding 48 is impressed across cathode 29 and control member 30 of electric valve 26 through a circuit including capacitance 50. A pair of serially connected resistances 51 and 52 are employed to impress on control members 30 of electric valves 24 and 26 a unidirectional negative biasing potential to be discussed hereinafter.

As an agency for selectively energizing the control members 30 of electric valves 24 and 26 of control circuit 12 to generate intermittent or periodic electrical impulses or to cause circuit 12 to generate only a predetermined number of electrical impulses, we employ a suitable circuit controlling means, such as a switch 53. When the switch 53 is in the left-hand position the circuit is connected to generate a train of periodic electrical impulses, and when the switch is in the right-hand position the excitation circuit for electric valves 24 and 26 is connected to a circuit 54 which modifies the negative unidirectional biasing potential impressed on control members 30 to permit these valves to generate only a predetermined number of electrical impulses, or only one electrical impulse. The circuit 54 may be of the type disclosed and claimed in the above identified copending application of Harold W. Lord. The circuit 54 includes a serially connected resistance 55, a capacitance 56 and a glow discharge valve 57 which are connected across the direct current source 13. An impedance element, such as a resistance 58 of relatively large value, is connected across the glow discharge valve 57 and serves as a means for impressing across the terminals thereof a relatively large transient voltage to render the valve conductive when a parallel circuit including a resistance 59 and a circuit controlling device, such as a switch 60, is opened. The circuit including the resistance 59 and switch 60 is connected across the serially connected capacitance 56 and the glow discharge valve 57. A voltage divider, including a serially connected resistance 61 and a capacitance 62 is responsive to the voltage of the valve 57, and is connected across electric valve 57 to supply a negative unidirectional biasing potential which is a predetermined component of the voltage appearing across the electric valve 57. This component of voltage is transmitted to the switch 53 for electric valves 24 and 26 through a conductor 63. An impedance 64 of relatively large value is connected in series relation with the conductor 63 and the excitation circuit for electric valves 24 and 26 and serves to render ineffective circuit 54 when the switch 53 is in the left-hand position. When the switch 53 is in the right-hand position, the impedance 64 is effectively short circuited to permit circuit 54 to exert its control on circuit 12. As a means for adjusting the resultant negative unidirectional biasing potential impressed on control members 30 of electric valves 24 and 26, we employ a voltage divider including a resistance 65 having an adjustable tap 66 which is energized in accordance with the voltage appearing across a predetermined portion of resistance 18.

A circuit 67 is employed to generate a periodic voltage or an impulse of voltage which controls the amount of energy transmitted to the load circuit 2 during each period of energization thereof, or which may be employed to control the ratio of the intervals of conduction to the intervals of nonconduction of the electric valves 7 and 8 during periodic energization of the load circuit 2, or which may be employed to control the duration of the period of energization of the load circuit 2 when the system operates to effect only one internal of energization thereof. The circuit 67 includes a capacitance 68 which is connected to be charged from the direct current source 13 through a serially connected resistance 69 and an adjustable impedance element such as an adjustable resistance 70. To discharge the capacitance 68 in response to the electrical impulses generated by circuit 12, we provide a serially connected inductance 71 and an electric valve 72 which are connected across capacitance 68. The electric valve 72 includes an anode 73, a cathode 74 and a control member 75 and is preferably of the type employing an ionizable medium such as a gas or a vapor. A capacitance 76 may be connected across the control member 75 and cathode 74 to absorb extraneous transient voltages and a current limiting resistance 76' may be connected in series relation with the control member 75. A parallel connected capacitance 77 and a resistance 78 are connected in series relation with the parallel circuits of circuit 12 to establish in circuit 12 an additional bias voltage. The circuit 67 is connected to the left-hand terminals of capacitance 77 and resistance 78.

We employ an excitation circuit for energizing control member 75 of electric valve 72 including a rectifier 79, energized in accordance with the voltage variations of secondary winding 34 of transformer 32, and including unidirectional conducting devices 80 and 81. The rectified impulses of alternating current transmitted through resistance 82 impress on control member 75 of electric valve 72 impulses of voltage which render electric valve 72 conductive. A parallel connected capacitance 83 and resistance 84 are connected in series relation with resistance 82 to impress on control member 75 of electric valve 72 peaked or sharply defined impulses of voltage.

To control the magnitude of the periodic voltages generated by the circuit 67 so that the impulses of this voltage are symmetrical and of corresponding magnitude, I provide a unidirectional conducting device 85 which is connected between the common juncture of capacitance 68 and cathode 74 of electric valve 72 and a point 86 on resistance 22. The features including the excitation circuit for electric valve 72 including the rectifier circuit 75 and the arrangement for controlling the magnitude of the periodic voltage generated by circuit 67 including electric valve 85 are disclosed and claimed in a copending application of Louis G. Levoy, Serial No. 146,021 filed concurrently herewith and assigned to the assignee of the present application.

The voltage generated by circuit 67 is employed to control the conductivities of electric valves 7 and 8. A circuit 87 including an electric valve 88 controls the energization of immersion-igniter control members 11 of electric valves 7 and 8. Electric valve 88 is provided with a control member 89 and is preferably of the type employing an ionizable medium such as a gas or a vapor. The voltage generated by the circuit 67 is impressed on control member 89 of electric valve 88 through a circuit including a conductor 90 and a serially connected resistance 91. A cathode 92 of electric valve 88 is connected to the common juncture of resistances 21 and 22 through a conductor 93. The circuit 87 is disclosed and broadly claimed in a copending application of Harold W. Lord, Serial No. 138,809, filed April 24, 1937 and assigned to the assignee of the present application. The circuit 87 controls electric valves 106 to energize control members 11 of electric valves 7 and 8, and includes a transformer 94 having secondary windings 95 and 96 and unidirectional conducting devices 97 and 98 which rectify the alternating voltages of peaked wave form generated by transformer 94. Transformer 94 is preferably of the saturable type designed to generate voltages of peaked wave form and may be energized from the alternating current circuit 1 through any conventional phase shifting arrangement such as the rotary phase shifter 99. Electric valve 88 controls the alternating voltage of peaked wave form and in conjunction with the unidirectional devices 97 and 98 energizes primary winding 101 of transformer 100 in opposite directions to induce a voltage of peaked wave form in secondary windings 102 and 103, which in turn energize excitation circuits 104 and 105 associated with electric valves 7 and 8, respectively. The voltages impressed on control members 11 of electric valves 7 and 8 may be controlled by adjusting phase shifter 99 to effect control of the amount of energy transmitted to the load circuit 2 during each half cycle of voltage applied to electric valves 7 and 8 during the periods of conduction thereof.

Each of the excitation circuits 104 and 105 includes an electric valve 106 which is energized in accordance with the voltage appearing across the anode 9 and the cathode 10 of the associated main electric valve and comprises an anode 107, a cathode 108, a control member, such as a grid 109, and a screen grid 110. The screen grid 110 may be connected to the cathode or to any potential less positive than that of the anode 107. Electric valves 106 are preferably of the type employing an ionizable medium, such as a gas or a vapor, and to serve as a protective means for these electric valves we employ a suitable current limiting arrangement such as a fuse 111 and a serially connected resistance 112. To impress on the grids 109 of electric valves 106 negative unidirectional biasing potentials, we employ any conventional arrangements such as rectifiers 113 each including a transformer 114, unidirectional conducting devices 115, a capacitance 116 connected across the output of the rectifier and a voltage divider 117. A predetermined component of the output voltage of the respective rectifiers 113 is impressed on the associated grid 109 through a circuit including serially connected resistances 118 and 119. A capacitance 120 is connected in each of the excitation circuits 104 and 105 and serves to absorb extraneous transient voltages induced in windings 102 and 103 of transformer 100 when electric valves 106 become nonconductive. The capacitance 120 also serves to prevent the transfer of extraneous transient voltages from excitation circuits 104 and 105 to transformer 100. When electric valve 106 in either excitation circuit 104 or 105 becomes nonconductive, there is impressed in the associated excitation circuit through the associated grid 109 a voltage of steep wave front which, were it not for the presence of capacitance 120, would be reflected to the transformer 100 and hence to the other excitation circuit. A capacitance 121 is connected across grid 109 and cathode 108 to absorb extraneous transient voltages. The voltages of peaked wave form generated by windings 102 and 103 of transformer 100 are impressed across the terminals of resistances 118 in excitation circuits 105 and 104, respectively, and are of a magnitude sufficient to overcome the negative unidirectional biasing potentials to render electric valves 106 conductive at the proper times.

The operation of the embodiment of our invention diagrammatically shown in Fig. 1 of the accompanying drawings will be explained when the system is operating to effect periodic energization of the load circuit 2. The switch 6, of course, is moved to closed circuit position and the electric valves 7 and 8 operate to control the voltage impressed on primary winding 4 of transformer 3 to control the energization of circuit 2.

Let it be assumed that it is desirable to energize the load circuit 2 periodically and that it is desirable to initiate consecutive energizations thereof during half cycles of voltage of opposite polarity of the alternating current circuit 1. To effect this result the switch 43 of circuit 12 is moved to the right-hand position so that the voltages impressed on control members 30 of electric valves 24 and 26 are displaced 180 electrical degrees. The manner in which this circuit operates to effect this type of control is explained in detail in the above mentioned copending patent application of Harold W. Lord, Serial No. 146,019. Furthermore, let it be assumed that the switch 53 is in the position shown in the drawings so that the circuit 12 generates a train of electrical impulses of predetermined periodicity. The periods of these impulses are determined primarily by the value of the capacitance 31, impedances 25 and 27, and the number of the impedances, including capacitances 36 and 37 and resistances 38 and 39, which are connected in the circuit 12. The circuit 12 will generate the periodic electrical impulses due to the alternate charging of capacitance 31 from the direct current source 13 through electric valves 24 and 26, and the anode currents transmitted by these electric valves will induce an alternating voltage in the secondary winding 34 of transformer 32. The alternating current output of secondary winding 34 is rectified by the rectifier 79 and impresses unidirectional impulses of voltage on control member 75 of electric valve 72 to render electric valve 72 conductive in accordance with the periodicity established by circuit 12.

Circuit 67 operates to generate a periodic control voltage of a predetermined period in response to the electrical impulses generated by the circuit 12. Capacitance 68, which is charged from the direct current source 13, is periodically discharged through the circuit including inductance 71 and electric valve 72, and the period of the periodic voltage generated by circuit 67 may be controlled by adjusting resistance 70. The periodic voltage generated by circuit 67 is impressed across control member 89 and cathode 92 of electric valve 88 in circuit 87, and renders electric valve 88 conductive for a predetermined time to permit the transmission of a predetermined number of impulses of voltage of peaked wave form, which in turn render electric valves 7 and 8 conductive for a corresponding interval of time.

The operation of the arrangement of our invention shown in Fig. 1 may be better understood by considering the operating characteristics represented in Fig. 2 where curve A represents the alternating voltage of supply circuit 1, and curve B represents the periodic electrical quantities generated by circuit 12 which determine the periodicity of the energizations of load circuit 12. Curve C represents the periodic control voltage generated by circuit 67 and which renders electric valve 88 in circuit 87 conductive for a predetermined number of half cycles of voltage of circuit 1. Curves D and E represent the alternating voltages impressed across anode 9 and cathode 10 of electric valves 7 and 8, respectively, and curve F represents the alternating voltages of peaked wave form generated in secondary windings 102 and 103 of transformer 100 and which are impressed on grids 109 of electric valves 106 to render electric valves 7 and 8 conductive. Spaces G represent the current in the load circuit 2 due to conduction of current by electric valve 7, and spaces H represent the current in the load circuit 2 due to the conduction of current by electric valve 8. Curves G and H represent the current transmitted to the load circuit 2 when circuit 87 is adjusted to control the amount of energy transmitted to the load circuit during the half cycles of energization of the load circuit 2. It is to be noted that although the period of electrical impulses generated by circuit 12 as represented by curve B may be relatively large, the periodic control voltage generated by circuit 67 is relatively small so that the interval of energization of the load circuit 2 is accurately determinable, and the ratio of the intervals of conduction to the intervals of nonconduction is also accurately determinable and controllable. As an additional matter, it is to be noted that the consecutive energizations of the load circuit 2 are initiated during half cycles of voltage of opposite or like polarity of the alternating current circuit 1 as desired by the operator.

If it is desired to effect only one period of energization of the load circuit 2 in response to a single circuit controlling operation, the switch 53 may be moved to the right-hand position to connect effectively circuit 54 to the system. The circuit 54 then impresses on control members 30 of electric valves 24 and 26, through resistances 51 or 52, 64, 61 and 58, a negative potential sufficient to render ineffective the alternating voltages generated by transformer 45. When the switch 60 is moved to the open circuit position, the negative unidirectional biasing potential impressed on control members 30 of electric valves 24 and 26 is temporarily decreased to permit the alternating voltages generated by transformer 45 to render electric valve 24 or 26 conductive. The switch 60 is normally maintained in the closed circuit position and when in that position the negative biasing potential supplied by circuit 54 is of sufficient magnitude to render ineffective the voltage supplied by transformer 45. Upon closing the switch 60 after an initiating operation, the circuit 54 is restored to its initial condition permitting a repetition of the above described sequence of operation. The operation of circuit 54 is more fully explained in the above identified copending application of Harold W. Lord, Serial No. 138,809.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, an alternating current supply circuit, a load circuit, electric valve translating apparatus connected between said circuits for effecting periodic energization of said load circuit by transmitting trains of electrical impulses thereto, means for generating a periodic electrical quantity to control the periodicity of said trains of impulses transmitted to said load circuit, and independent means responsive to said electrical quantity for generating a periodic voltage to control the ratio of the intervals of conduction to the intervals of nonconduction of said electric valve translating apparatus.

2. In combination, an alternating current supply circuit, a load circuit, electric valve translating apparatus connected between said circuits for effecting periodic energization of said load circuit by transmitting trains of electrical impulses thereto, a circuit for generating a periodic electrical quantity to control the periodicity of said trains of impulses transmitted to said load circuit, and a circuit comprising a source of direct current, a capacitance and an electric valve responsive to said electrical quantity for generating a periodic voltage to control the ratio of the intervals of conduction to the intervals of nonconduction of said electric valve translating apparatus.

3. In combination, an alternating current supply circuit, a load circuit, electric valve translating apparatus interposed between said circuits for transmitting energy therebetween, a source of direct current, a circuit energized from said source for determining the periodicity of the energization of said load circuit by said electric valve translating apparatus comprising a capacitance and an electric valve means for effecting periodic charge and discharge of said capacitance to provide a periodic electrical quantity, and a circuit including a capacitance arranged to be charged from said source of direct current and an electric valve for effecting discharge of said second mentioned capacitance in accordance with said periodic electrical quantity for controlling the conductivity of said electric valve translating apparatus to control the duration of the periods of energization of said load circuit.

4. In combination, an alternating current supply circuit, a load circuit, electric translating apparatus including electric valve means having a control member for effecting periodic energization of said load circuit by transmitting trains of electrical impulses thereto, a circuit for generating a periodic electrical quantity to control the periodicity of said trains of impulses transmitted to said load circuit and a circuit comprising a source of direct current, a capacitance and an electric valve responsive to said electrical quantity for impressing on said control member of said electric valve means a periodic control voltage to control the interval of time between consecutive energizations of said load circuit.

5. In combination, an alternating current supply circuit, a load circuit, electric translating apparatus comprising electric valve means having a control member for effecting periodic energization of said load circuit by transmitting trains of electrical impulses thereto, an excitation circuit for energizing said control member comprising means for impressing thereon an alternating voltage of peaked wave form, a circuit for generating a periodic electrical quantity to control the periodicity of said trains of impulses transmitted to said load circuit, and a circuit comprising a source of direct current, a capacitance and an electric valve responsive to said electrical quantity for generating a periodic voltage to control said excitation circuit.

6. In combination, an alternating current supply circuit, a load circuit, electric translating apparatus including electric valve means having a control member for effecting periodic energization of said load circuit by transmitting trains of electrical impulses thereto, an excitation circuit for energizing said control member comprising a source of alternating voltage of peaked wave form and a single electric valve having a control member for controlling the number of half cycles of voltage of peaked wave form impressed on said first mentioned control member, a circuit for generating a periodic electrical quantity to control the periodicity of the energization of said load circuit, and a circuit comprising a source of direct current, a capacitance connected to be charged from said source and an electric valve responsive to said electrical quantity for periodically discharging said capacitance to impress a periodic voltage on the control member of the electric valve in said excitation circuit to control the maximum consecutive number of half cycles of voltage of peaked wave form transmitted thereby.

7. In combination, a source of direct current, a circuit including a pair of parallel electric paths connected to said source of direct current and each including a serially connected impedance element and an electric valve, a capacitance connected across said parallel paths arranged to be charged alternately in opposite directions through the electric valves for generating a periodic electrical quantity, a second circuit for generating a periodic voltage comprising a capacitance connected to be charged from said source of direct current and an electric valve means for periodically discharging said second mentioned capacitance in accordance with said periodic electrical quantity, and means for controlling said second circuit to control the period of said periodic voltage.

8. In combination, an alternating current supply circuit, a load circuit, electric valve translating apparatus for effecting periodic energization of said load circuit from said supply circuit, a source of direct current, a circuit energized from said source of direct current comprising a pair of parallel electric paths each including an electric valve having a control member, a capacitance connected across said paths and arranged to be charged alternately in opposite directions through the electric valves and means for selectively energizing said control members to generate a periodic electrical quantity consecutive impulses of which occur during half cycles of voltage of selected polarity of said supply circuit, and a circuit including a capacitance connected to be charged from said source and an electric valve responsive to said periodic electrical quantity for periodically discharging said second mentioned capacitance to supply a periodic voltage for controlling said electric valve translating apparatus to control the amount of energy transmitted to said load circuit during each period of energization thereof.

LOUIS G. LEVOY, Jr.
GEORGE W. GARMAN.